(12) United States Patent
Soomro et al.

(10) Patent No.: US 9,035,772 B2
(45) Date of Patent: May 19, 2015

(54) TRACKING RFID OBJECTS WITH INTEGRATED COMMUNICATION LINK

(75) Inventors: Amjad Soomro, Hopewell Junction, NY (US); Yasser Alsafadi, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1629 days.

(21) Appl. No.: 11/917,899

(22) PCT Filed: Jun. 15, 2006

(86) PCT No.: PCT/IB2006/051936
§ 371 (c)(1),
(2), (4) Date: Aug. 27, 2009

(87) PCT Pub. No.: WO2006/134577
PCT Pub. Date: Dec. 21, 2006

(65) Prior Publication Data
US 2009/0315717 A1 Dec. 24, 2009

Related U.S. Application Data

(60) Provisional application No. 60/691,130, filed on Jun. 16, 2005.

(51) Int. Cl.
*G08B 13/14* (2006.01)
*G06K 7/10* (2006.01)
*G06K 7/00* (2006.01)
*G06K 17/00* (2006.01)

(52) U.S. Cl.
CPC .......... *G06K 7/10079* (2013.01); *G06K 7/0008* (2013.01); *G06K 7/10356* (2013.01); *G06K 2017/0045* (2013.01)

(58) Field of Classification Search
USPC ............... 340/572.1, 573.1, 539, 573.4, 5.81, 340/539.12, 572.4, 825.49, 10.1, 10.41, 340/539.13, 539.1; 342/457, 386
See application file for complete search history.

(56) References Cited

U.S. PATENT DOCUMENTS

| | | | | |
|---|---|---|---|---|
| 5,940,006 | A | * | 8/1999 | MacLellan et al. ........... 370/314 |
| 6,091,319 | A | * | 7/2000 | Black et al. .................. 340/10.2 |
| 6,170,748 | B1 | * | 1/2001 | Hash et al. .................... 235/451 |
| 6,172,596 | B1 | * | 1/2001 | Cesar et al. ................ 340/10.41 |
| 6,300,903 | B1 | * | 10/2001 | Richards et al. .............. 342/450 |
| 6,700,533 | B1 | | 3/2004 | Webb |
| 6,859,801 | B1 | * | 2/2005 | Law et al. ............................ 1/1 |
| 7,005,968 | B1 | | 2/2006 | Bridgelall |
| 2001/0001239 | A1 | * | 5/2001 | Stewart ......................... 342/457 |
| 2002/0070862 | A1 | | 6/2002 | Francis et al. |
| 2002/0075145 | A1 | * | 6/2002 | Hardman et al. ............. 340/442 |
| 2002/0149481 | A1 | | 10/2002 | Shanks et al. |
| 2002/0149483 | A1 | | 10/2002 | Shanks et al. |

(Continued)

FOREIGN PATENT DOCUMENTS

| | | |
|---|---|---|
| JP | 2003536296 A | 12/2003 |
| JP | 2004336089 A | 11/2004 |

(Continued)

*Primary Examiner* — Hoi Lau

(57) ABSTRACT

A wireless system (101) includes a plurality of objects (106). The wireless system includes a controller 102 and a radio frequency identification (RFID) read-write (RW) device (103, 104, 105). Each of the objects includes an RFED device (107) and a transceiver (108). An object and methods of tracking objects are also disclosed.

30 Claims, 4 Drawing Sheets

(56) References Cited

U.S. PATENT DOCUMENTS

| | | |
|---|---|---|
| 2003/0174099 A1 | 9/2003 | Bauer et al. |
| 2004/0027243 A1* | 2/2004 | Carrender ................. 340/568.1 |
| 2004/0049428 A1 | 3/2004 | Soehnlen |
| 2004/0090333 A1* | 5/2004 | Wildman et al. .......... 340/573.1 |
| 2004/0153970 A1 | 8/2004 | Shinoda et al. |
| 2004/0203377 A1 | 10/2004 | Eaton |
| 2004/0203870 A1 | 10/2004 | Aljadeff |
| 2005/0030160 A1* | 2/2005 | Goren et al. ................. 340/10.5 |
| 2005/0035860 A1* | 2/2005 | Taylor et al. ............... 340/572.1 |
| 2005/0035862 A1* | 2/2005 | Wildman et al. .......... 340/573.1 |
| 2005/0110612 A1 | 5/2005 | Carrender |
| 2005/0253722 A1* | 11/2005 | Droms et al. .............. 340/572.1 |
| 2006/0004484 A1* | 1/2006 | Hornbaker et al. ............ 700/225 |
| 2007/0109099 A1* | 5/2007 | Raphaeli et al. ............. 340/10.2 |
| 2008/0042844 A1* | 2/2008 | Christopher ............... 340/572.4 |
| 2009/0059035 A1 | 3/2009 | Shinoda et al. |
| 2009/0189759 A1* | 7/2009 | Wildman et al. ........ 340/539.12 |

FOREIGN PATENT DOCUMENTS

| | | |
|---|---|---|
| JP | 2005121549 A | 5/2005 |
| WO | 0106401 | 1/2001 |
| WO | 0106401 A1 | 1/2001 |
| WO | 2004092999 | 10/2004 |
| WO | 2004092999 A2 | 10/2004 |

\* cited by examiner

TRACKING RFID OBJECTS WITH INTEGRATED COMMUNICATION LINK

CROSS REFERENCE TO RELATED APPLICATION

This application claims the benefit of U.S. provisional application Ser. No. 60/691,130 filed Jun. 16, 2005, which is incorporated herein by reference.

Tracking or monitoring of an object provides a history (location and time) of the object's movements. This tracking can be widely applied to a variety of objects and the information garnered in the tracking can be exceedingly useful. For example, it is often desirable to maintain information on the whereabouts of a package in transit. Moreover, it may be imperative to be able to ascertain the location of a patient in a hospital.

Certain techniques have been implemented to ascertain the location of an object. One technique attempts to determine the location of an object using data of the signal strength of a signal transmitted from the object. However, this method can result in inaccuracy in object location. For example, the signal strength can vary due to channel variations over time, even when the object is stationary. Moreover, there may be physical obstacles between the object and a central device. These physical obstacles can result in signal attenuation and non-uniform path losses. In general, the determination of the location of an object based on the signal strength from an object received at the central device, by itself, is not a reliable method due to the inconsistent correlation between the object's location and the signal strength.

Another technique used to determine the location of an object includes the use of a radio frequency (RF) identification (ID) system. An RFID system normally includes a plurality of RFID tagged objects (also referred to as RFID objects) and a network of RFID read/write (RW) devices each in a particular fixed location. The RFID objects communicate with the RW devices when the objects are in relatively close proximity to the RW devices. In a known system, this communication includes the transmission of an ID signal from the particular RFID object to the particular RW device. The proximity of an RFID object to the known location of the RW device sets the location of the RFID object at a particular moment in time. Once ascertained, the RW device may record the time that the RFID object communicated, and thus store the location of a particular RFID device at a particular time. The RW devices are linked to a central device (e.g., a location tracking device) by either a wired or wireless link. During operation, the central device can access the data from each of the RW devices in its network to gather the location information of the RFID tagged objects.

While the RFID-based system noted above does provide location information on RFID objects, there are drawbacks to such systems. Notably, this system requires a network of RW devices, which must be adapted to communicate with the central device to provide the data from the RFID objects. This network can be cumbersome and expensive. Moreover, when an RFID object is outside the range of a RW device, its location is lost unless and until the object travels within the range of another RW device. Thus, all areas excepting those in rather close proximity of the RW devices are 'blackout' areas. Finally, if for some reason the communications between the RW devices and the system fails, the tracking function and the link to the RFID objects is lost.

What is needed, therefore, is a method and apparatus for determining the location of objects that overcome at least the shortcomings of the known methods and apparati described above.

In accordance with an example embodiment, a wireless system includes a controller and a radio frequency identification read-write (RFID RW) device. The wireless system also includes a plurality of objects, each including a radio frequency identification (RFID) device adapted to receive information from the RFID RW device. In addition, each object includes a transceiver adapted to transmit information to and receive information from the controller.

In accordance with another example embodiment, an object includes a radio frequency identification (RFID) device, which is adapted to receive information from an RFID RW device. The object also includes a transceiver, which is coupled to the RFID device, wherein the transceiver is adapted to transmit information to and receive information from a controller, or a tracking application device, or both.

In accordance with another example embodiment, a method of tracking objects includes providing a plurality of RFID RW devices in a wireless network; providing an RFID device in each of the objects; transmitting data from the RFID RW devices to the objects; providing a transceiver in each of the objects; and transmitting the data from the objects to a controller, or to a tracking application device, or both.

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 1 is a conceptual diagram of a wireless system in accordance with an example embodiment.

FIG. 2*a* is block diagram of an object in accordance with an example embodiment.

FIG. 2*b* is a block diagram of an object in accordance with an example embodiment.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

The terms 'a' or 'an', as used herein are defined as one or more than one. The term 'plurality' as used herein is defined as two or more than two. The term 'coupled' is defined herein as connected to (e.g., electrically), although not necessarily directly, and not necessarily mechanically.

Figure 1:
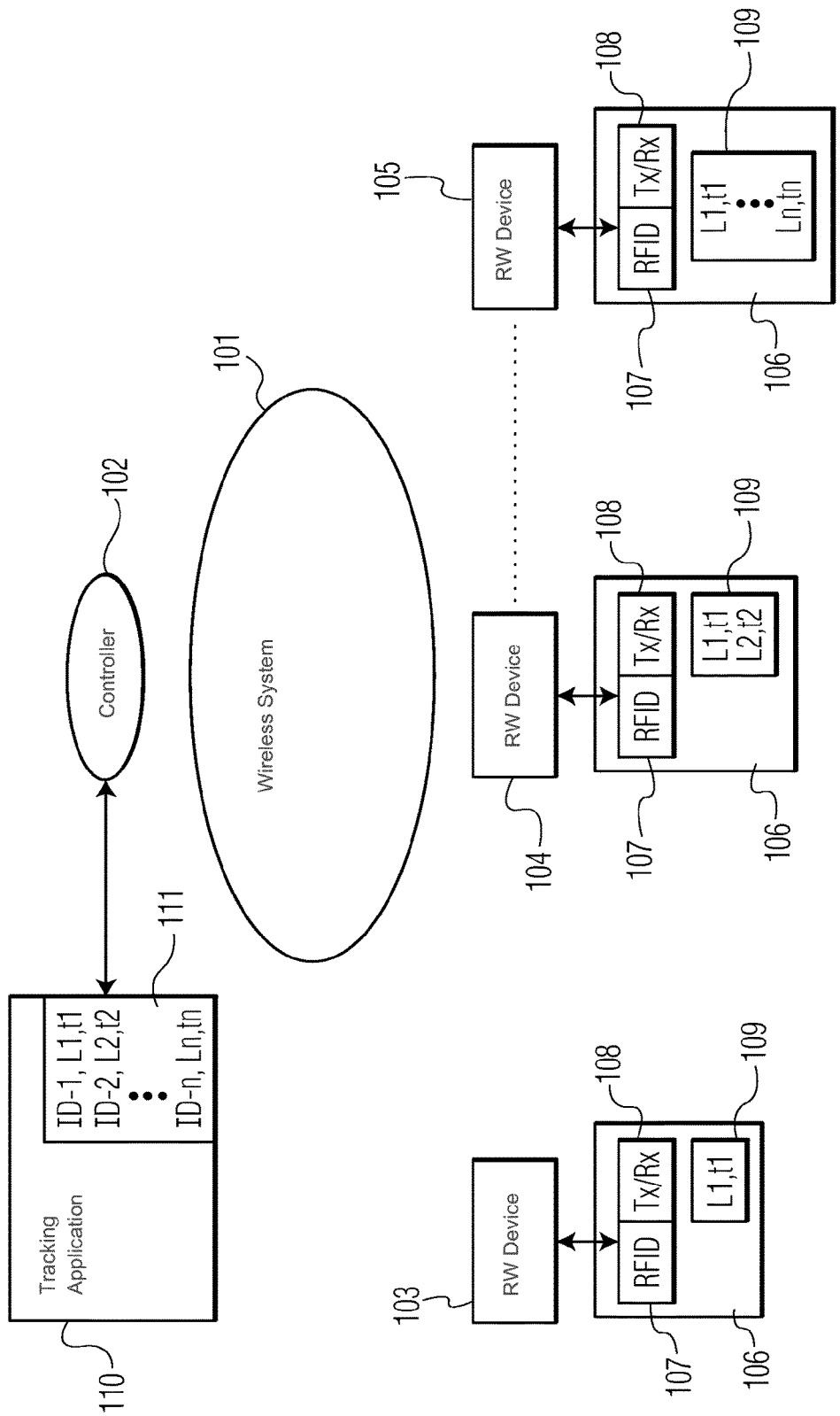

FIG. 1 is a conceptual diagram of a wireless system 101 in accordance with an example embodiment. Illustratively, the wireless system 101 is a wireless local area network (WLAN). The system 101 includes a central control site (controller) 102. In addition, the system 101 includes at least one RFID RW device (RW). In a specific embodiment, the system includes a first RW device 103, a second RW device 104 and an nth (n=integer) RW device 105. Notably, the RFID RW devices 103-105 are stand-alone units that are not coupled (or otherwise networked) to one another or to the controller 102. In a specific embodiment, the RW devices 103-105 are in fixed locations, while in another specific embodiment, the RW device 103-105 may be readily moved. In either of these embodiments, the location of the RW devices is programmed into a memory (not shown) in the RW device or is known a priori by the tracking application. In yet another specific embodiment, the RFID RW devices 103-105 are mobile or are adapted to follow a trajectory. In such an embodiment, the whereabouts of the RFID RW devices 103-105 may be ascertained or calculated by known methods. For example, the RFID RW devices' location may be ascertained by a global positioning system (GPS).

The system 101 also includes at least one object 106, which includes an RFID device 107 and a transceiver 108. In a specific embodiment, the transceiver 108 is a WLAN device, which is adapted to transmit information to or receive information from the controller 102 or other devices in the WLAN. Illustratively, the RFID device 107, or the transceiver 108, or both, are coupled to or are integrated into the object 106. In addition, each object 106 includes an RFID device 107 and a transceiver 108. Notably, the object(s) 106 do not include GPS devices. Moreover, the RFID device 107 and the transceiver 108 may share a common memory, or a communication link, or both.

In an example embodiment, the system 101 includes a tracking application. The tracking application enables monitoring of the path taken by the object(s) 106 in the system 101 over time. In a specific embodiment, the tracking application is effected via a tracking application device 110. In the embodiment shown in FIG. 1, the tracking application device 110 is separate from the controller 102. The tracking application device may communicate with the controller 102 in a wireless manner (e.g., via the WLAN) and thus may be a station in the network. Alternatively, the tracking application device 110 may communicate with the controller 102 via a wired connection. In yet another example embodiment, the tracking application device 110 is a component of the controller 102, and is thus integral thereto.

The information 109 provided to the tracking application device 110 from the object(s) 106 is compiled into tracking information 111, which is optionally stored in the tracking application device 100. In a specific embodiment, the tracking application device is implemented in hardware and software necessary to calculate the path of the object(s) 106 over time and uses the information 111 to effect this calculation. To meet this desired end, the traffic application device 110 may include a microprocessor or an application specific integrated circuit (ASIC) and suitable software to calculate the path of an object 106 over time, as well as other transit related information. As the hardware and software required to effect the path calculations and other transit related information is within the purview of one of ordinary skill in the art having had the benefit of the present disclosure, such details of the hardware and software are not included.

The tracking application provided by the tracking application device 110 may be useful in a variety of settings. For example, the object(s) 106 may be a package in transit by a shipper. The path of the package may be garnered by the tracking application device 110, and may be in response to queries from the device 110 input by a user interested in the whereabouts of the package over time. It is emphasized that this is merely illustrative of the tracking application device 110 and tracking information 111.

In specific embodiments where the system 101 is a WLAN, communications between the controller 102 (e.g., an access point (AP)), or the tracking application device 110, or both, other devices in the wireless system 101 and the object 106 (via the transceiver 108) may be realized with a variety of known wireless communications apparati and methods. For example, the communications between the object 106 and the controller 102 may be in accordance with: IEEE 802.11 and its progeny or IEEE 802.15; or known mobile cellular telephone networks; or known RF channel-based communications (e.g., two-way messaging); or Digital Enhanced Cordless Telecommunications (DECT); or Bluetooth; or Global System for Mobile communications (GSM); or known infrared communications. Notably, if the controller 102 were part of a system in compliance with IEEE 802.15, it would be a piconet controller. As these communications methods and apparati are known to one of ordinary skill in the art, details thereof are omitted in order to avoid obscuring the description of example embodiments. The apparati and methods may be implemented in hardware and software within the purview of one of ordinary skill in the art.

Moreover, the networking between the controller 102, the tracking application device 110, the object(s) 106 (via the transceiver 108), and other devices in the system 101 may be adapted to function in accordance a variety of communications protocols, including, but not limited to: Time Division Multiple Access (TDMA); or Code Division Multiple Access (CDMA); or Carrier Sense Multiple Access (CSMA); or CSMA with collision avoidance (CSMA/CA). The apparati and methods may be implemented in hardware and software within the purview of one of ordinary skill in the art.

Communications between the RFID RW devices 103-105 and the RFID device 107 of the object 106 is carried out using known RFID apparati and methods. To this end, radio frequency identification (RFID) is a method of remotely storing and retrieving data using devices known as RFID devices. RFID devices 107 contain antennae and circuitry (not shown) that allows the device to receive and respond to radio-frequency queries from an RFID RW device (e.g., RFID RW devices 103-105). As such, the RFID RW devices 103-105 of the example embodiment are adapted to communicate with RFID device(s) 107 of the object(s) 106, but are not adapted to communicate with the controller 102 and are not adapted to communicate with the traffic application device 110.

The RFID device 107 may be an active device, including its own power supply. Alternatively the RFID device 107 or may be a passive device, which uses the energy from received signals to transmit a response thereto. Moreover, the RFID device 107 may function at a variety of frequencies depending on their application and capabilities. For example, the RFID device 107 may function at low frequency (e.g., 125 kHz to 134 kHz), or high frequency (13.56 MHz), or UHF (868 MHz to 956 MHz), or microwave frequency (e.g. 45 GHz). As the details of RFID devices are known, such known details are omitted so as to avoid obscuring the details of example embodiments.

In operation, the object 106 stores information 109. The information 109 may include a unique identifier, the RFID RW device ID, which identifies the RFID RW device(s), as well as other associated information as information 109. This information 109 may be useful in the tracking application discussed above. Illustratively, the RFID RW device IDs, ID_1, ID_2 and ID-n, identify the RFID RW devices 103, 104, 105, respectively. The associated information of the RFID RW device(s) 103-105 may be their respective spatial coordinates (e.g., x,y,z coordinates). Optionally, the associated information includes the time that the object 106 passed within the transmission range of or received a transmission from the RFID RW device(s) 103-105 (e.g., t1, t2, . . . ). Notably, the object 106 may record the time that it passed within transmission range and received the RFID RW device ID from the particular RFID RW device.

In a specific embodiment, the associated information of the RFID RW devices 103-105 may be that of a particular function. For example, if the object 106 were part of or attached to a manufactured product, then the associated information may reflect the function that was applied to the product. For instance, the object 106 could store that the device had been inspected by a Quality Inspector having a certain RFID RW device. In yet another embodiment, the associated information may be linked to a role in an organization, such as that of an attending physician. In yet another example embodiment, the associated information may be that of a function such as check-in/check out information at an auto rental facility. In yet another example embodiment the information may relate to a function such as a document approval process. As can be appreciated, there are various and sundry embodiments of the RFID RW devices 103-105 and the associated information they can provide. It is emphasize that the examples given here are merely intended to illustrate some of the many embodiments.

Table 1 further illustrates different types of information 109 that can be associated with the identity of an RFID RW device and stored on the object 106. The first column provides the identification of the RFID RW device 103-105. The second column provides the locations of the RFID-RW devices. The third, fourth and fifth columns provide the function, role or status, respectively. Each of these columns relates to a particular application of a group of RFID RW devices 103-105. For example, the third column, the function, may be an embodiment in which the group of RFID RW devices 103-105 is part of a tracking scheme in a manufacturing operation. The forth column may be an embodiment in which the implementation of the RFID RW devices 103-105 is in a hospital or medical setting. The fourth column illustrates an embodiment of the RFID RW devices in a document review process. As noted previously, the types of information listed in Table 1 are merely illustrative.

TABLE I

| RFID RW ID | Location | Function | Role | Status |
|---|---|---|---|---|
| ID_1 | L1 (x1, y1, z1) | Quality Inspector | Nurse | First Review |
| ID_2 | L2 (x2, y2, z2) | Quality officer | Emergency Nurse | Second Review |
| ID_3 | L3 (x3, y3, z3) | Reject Handler | ICU Nurse | Interim Review |
| ID_4 | L4 (x4, y4, z4) | Unit Supervisor | Attending Physician | Peer Review |
| ID_n | Ln (xn, yn, zn) | Plant Manager | Discharge Physician | Final Review |

As described more fully herein, the information 109 garnered from the RFID-RW devices 103-105 by the object(s) 106 in the system 101 is stored at the object(s) 106. The information 109 may be retrieved by or otherwise provided to the controller 102. The information 109 may be derived by the controller 102 as described herein.

The information 109 may be provided to the controller 102 in response to a query from the controller 102 to the object(s) 106. Such a query or request for information would be carried out in accordance with the relevant communication protocol of the governing the system 101. Alternatively, the information 109 may be provided autonomously by the object(s) 106. As detailed herein, the autonomous transmission from the object(s) to the controller 102 may be effected upon achieving certain criteria, such as time or data limits.

In a specific embodiment, the information 109 is transmitted to the tracking application device 110 via the controller 102. The tracking application device 110 may provide a query to an object(s) 106 via the controller. For example, the tracking application device 110 may communicate the query (or a plurality of queries) to the controller 102, which then relays the query to the appropriate object(s) 106 in the system. The object(s) 106 may then transmit the information 109 to the controller 102 using the transceiver 108. The controller 102 then provides the information 109 to the device 110.

Alternatively, the information 109 may be provided initially to the controller 102 and ultimately to the tracking application device 110 autonomously by the object(s) 106 at predefined intervals or according to predetermined criteria, or both. For example, the predetermined criteria may be associated with a number of communications between the objects(s) 106 and the RFID RW devices 103-105, or may be associated with the occurrence of a small number of communications or no communications between the object(s) 106 and RFID RW devices 103-105 in the specified time interval.

In another specific embodiment, the information 109 is transmitted directly to the tracking application device 110 by the transceiver 108 of the object(s) 106. Like transmissions between the object(s) 106 and the controller 102, the transmission of information 109 may be in response to queries from the tracking application device 110. Alternatively, the information 109 may be provided autonomously from the object(s) 106 directly to the device 110 at certain intervals or according to predetermined criteria, of both. Illustratively, the communication between the object(s) and the tracking application device 110 is via the wireless system (e.g., WLAN) 101.

Figure 2A:
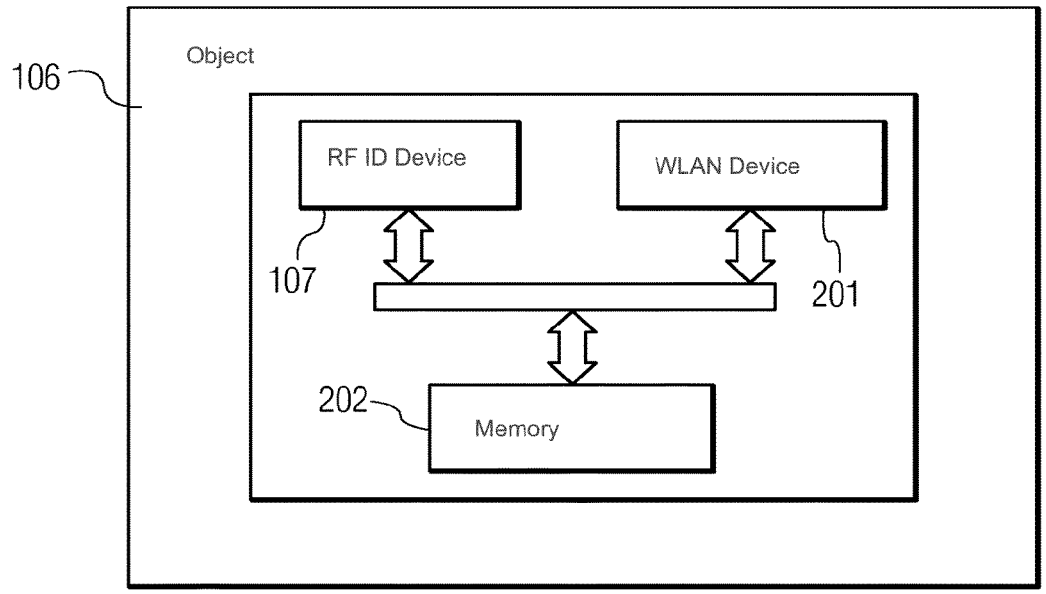

FIG. 2a is a simplified block diagram of the object 106, including the RFID device 107, a WLAN device 201 and a shared memory 202. Illustratively, the RFID device 107, the WLAN device 201 and the shared memory 202 are integrated as a unit. As can be appreciated, the object 106 is a mobile device. In a specific embodiment the object 106 may be a card (e.g., a smart card), or a cellular telephone, or a mobile radio terminal, or a mobile cellular telephone with an attached data terminal, or a portable computer, or a personal digital assistant (PDA), or a two-way messaging device a card, or a patient monitoring device, or a merchandise tag.

Regardless of the type of object 106, the WLAN device 201 comprises the hardware and software to realize the transmission and reception of information (voice, or video, or data, or a combination thereof) between the object 106 and the controller 102, or the tracking application device 110, or both, of the system 101. The hardware and software are within the purview of one of ordinary skill in the art, details thereof are omitted in order to avoid obscuring the description of the example embodiments. It is emphasized that the WLAN device 201 is a specific embodiment of the transceiver 108 and may function in accordance with many or all of the protocols referenced previously in conjunction with the transceiver 108.

As described in detail herein, the shared memory 202 is adapted to receive data (e.g., information 109) from the RFID device 107 and to provide these data to the WLAN device 201, which then may transmit the data to the controller 102 or to the tracking application device 110, or both. Furthermore, other information (e.g., data) may be received by the WLAN device 201 and stored in the memory 202. For example, the WLAN device 201 may store voice packets to be transmitted to the controller 102 or received from the controller 102 in the memory 202.

Figure 2B:
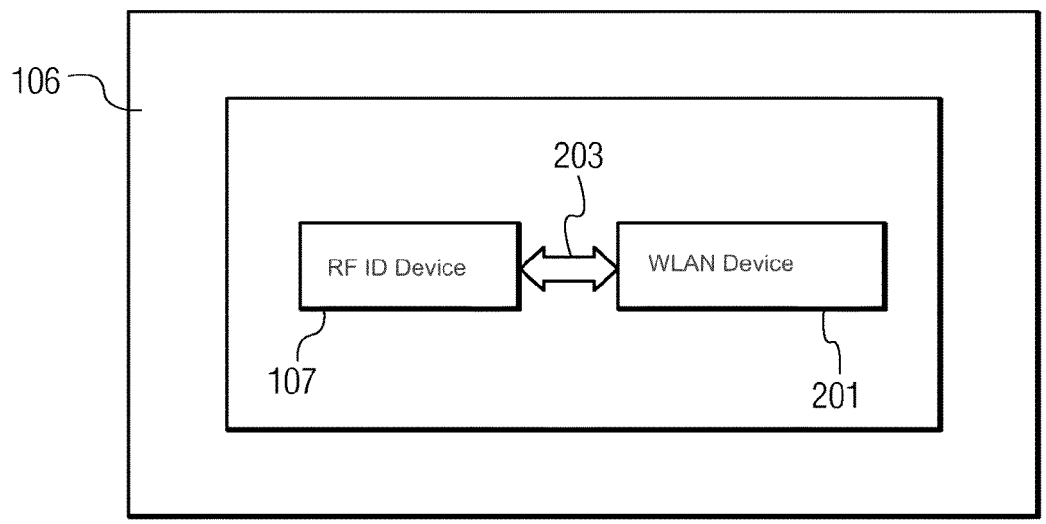

FIG. 2b is a simplified block diagram of the object 106 in accordance with another example embodiment. The object 106 includes the RFID device 107 and the WLAN device 201. The object 106, the RFID device 107 and the WLAN device 201 are substantially the same as those described in connection with the example embodiment of FIG. 2a, and the details thereof are not repeated. However, the object 106 does not include a shared memory. Rather, a communications link 203 is provided between the RFID device 107 and the WLAN device 201. As detailed herein, as data (e.g., information 109) are garnered by the RFID device 107 or the WLAN device 201, these data may be provided to the WLAN device 201 or the RFID device 107, respectively. Notably, the communication link 203 may be on a variety of well known electrical interface technologies, including, but not limited to a serial link, or a bus, or an optical link, or a Secure Digital Input Output (SDIO) card.

Among other benefits, the system 100 of the example embodiments substantially ensures privacy of information 109 of the object(s) 106. In particular, the information 109 is maintained in the memory 202 or otherwise in the object 106 as described in connection with FIGS. 2a and 2b. Thus, the information 109 is not accessible except via the object 106. Furthermore, the object(s) 106 can employ various techniques to determine what information to transmit whether in response to queries or autonomously. Furthermore, the object(s) 106 does not necessarily respond to each query from every device. For example, the object 106 may require verification of the authenticity of a query from the controller 102 or the tracking application device 110 using authentication at the network layer of the wireless system 101 (e.g., at the network layer of the WLAN) or using application layer authentication. These authentication methods are specific to the particular type of network (e.g. WLAN 101) or communication protocol and the details of the respective methods are known to one of ordinary skill in the art.

Figure 3:
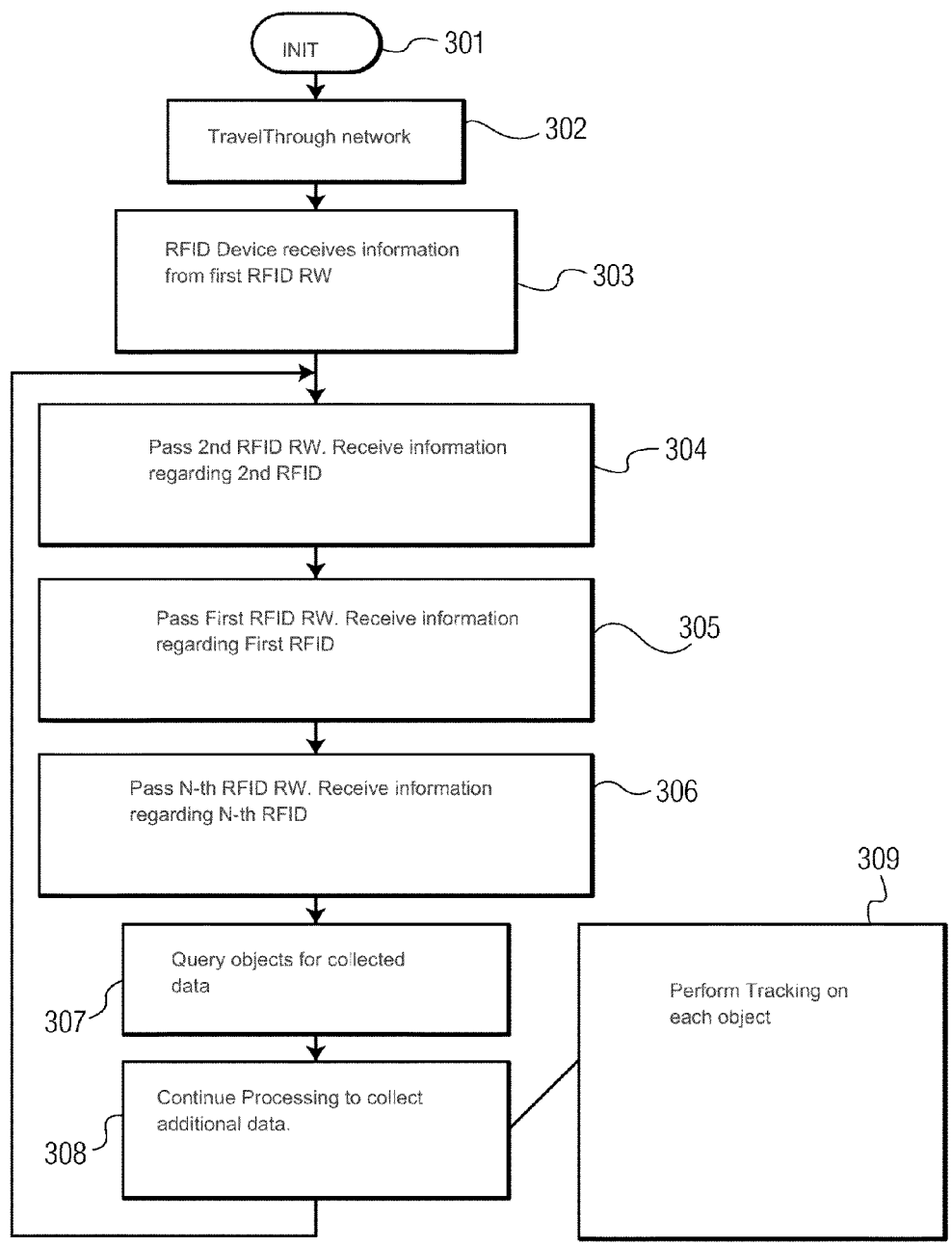
FIG. 3 is a flow chart of a method of determining the location of objects in accordance with an example embodiment.

FIG. 3 is a flow chart of a method in accordance with an example embodiment. The method is best understood when reviewed in conjunction with FIGS. 1-2b. Notably, in the interest of simplicity, the method is described for one object 106 in the system 101. It is emphasized that this is but a specific embodiment, and that the method may be implemented via a plurality of objects 106 in the system 101. At step 301, the method commences with an initialization sequence particular to the type of system and protocol used. Next, at step 302, the object 106 travels in proximity to Location 1 (L1), where the first RW device 103 is located. When in range of the first RW device 103, the RFID device 107 receives information from the first RW device 103. In a specific embodiment of Step 303, the RFID device 107 receives the location (L1) of the RFID RW device 103 by the RFID RW device ID (ID_1), which is the code indicative of its unique identity.

In addition, the first RFID RW device 103 may provide the time (t1) of the transmission to the RFID device 107. The transmission of the time t1 may be foregone, as the time of the reception of the RFID RW device ID and the location may be recorded via a clocking mechanism within the RFID device 107, or other clocking mechanism within the object 106 (referred also as a mobile device). The data garnered from the first RW device 103 (and internal time clock, if applicable) may then be stored in the shared memory 202, where it can be accessed by the WLAN device 201, or accessed and transmitted by the transceiver 108 of the object 106. Alternatively, the data may be passed to the WLAN device 201 (or transceiver 108) by the link 203. In either embodiment, the RFID RW device ID of the first RW device 103 and/or its location, and optionally the time that the object 106 passed in range of the device 103, are recorded and accessible to the WLAN device 201.

In another specific embodiment, the information 109 may be transmitted directly to the tracking application device 110 or to the device 110 via the controller 102, as described previously.

At step 304, the mobile device passes in proximity of the second RFID RW device 104 located at a location L2. The second RFID RW device 104 transmits its RFID RW device ID (ID_2) and/or its location, L2, and optionally the time (t2) of transmission to the object 106. Again, this may be stored in the shared memory 202, or may be passed to the WLAN 201 via the link 203.

At step 305, the object 106 passes in proximity once again to the first RW device 103. The first RW device 103 transmits its RFID device ID (ID_1), and/or it location L1, and optionally, a time (t3) of the transmission. The data may then be stored in the shared memory 202 or passed to the WLAN device 201 via the link 203.

At step 306, the object 106 passes in proximity to the nth RW device 105. The nth RW device 105 transmits its RFID RW device ID (ID_n), or its location (Ln), or both, and, optionally, the time of the transmission (tn) to the RFID device 107. As described previously, these data may then be stored by the shared memory 202, or may be transmitted to the WLAN device 201, via the link 203.

As detailed herein, the acquisition of data may continue for a specific period of time (e.g., a beacon period, or a service period) as set by the controller 102, or by the tracking application device 110, or both.

At the end of this period of time, at step 307, the controller 102 may query the object 106 for the data (e.g., information 109), which illustratively includes the location and time information described previously. Alternatively, the tracking application device 110 may query the object 106 directly or via the controller 102 within an arbitrary period of time. Still alternatively, the object 106 may be queried by any another device in its network. Upon receiving the query or queries, and in accordance with the relevant protocol governing the system 101, the WLAN device 201 transmits the information 109 requested to the controller 102, or to the tracking application device 110, or both. These data may be retrieved from the shared memory 202, or may be retrieved from an internal memory of the WLAN device 201. Regardless, the object 106 provides the data directly to the controller 102 or the device 110, or both. This is in contrast to known RFID systems, where the RFID RW devices communicate with a centrally located device and the RFID object is incapable of directly communicating with the centrally located device or the tracking application device.

At step 309, the controller 102 or the tracking application device 110, or both compile the path of the object by associating the identity of each RFID RW 103-105 with its location and the time. Thereby, the whereabouts of the object may be readily ascertained over the specified period of time. After the completion of step 308, the method may repeat beginning at step 304.

Figure 4:
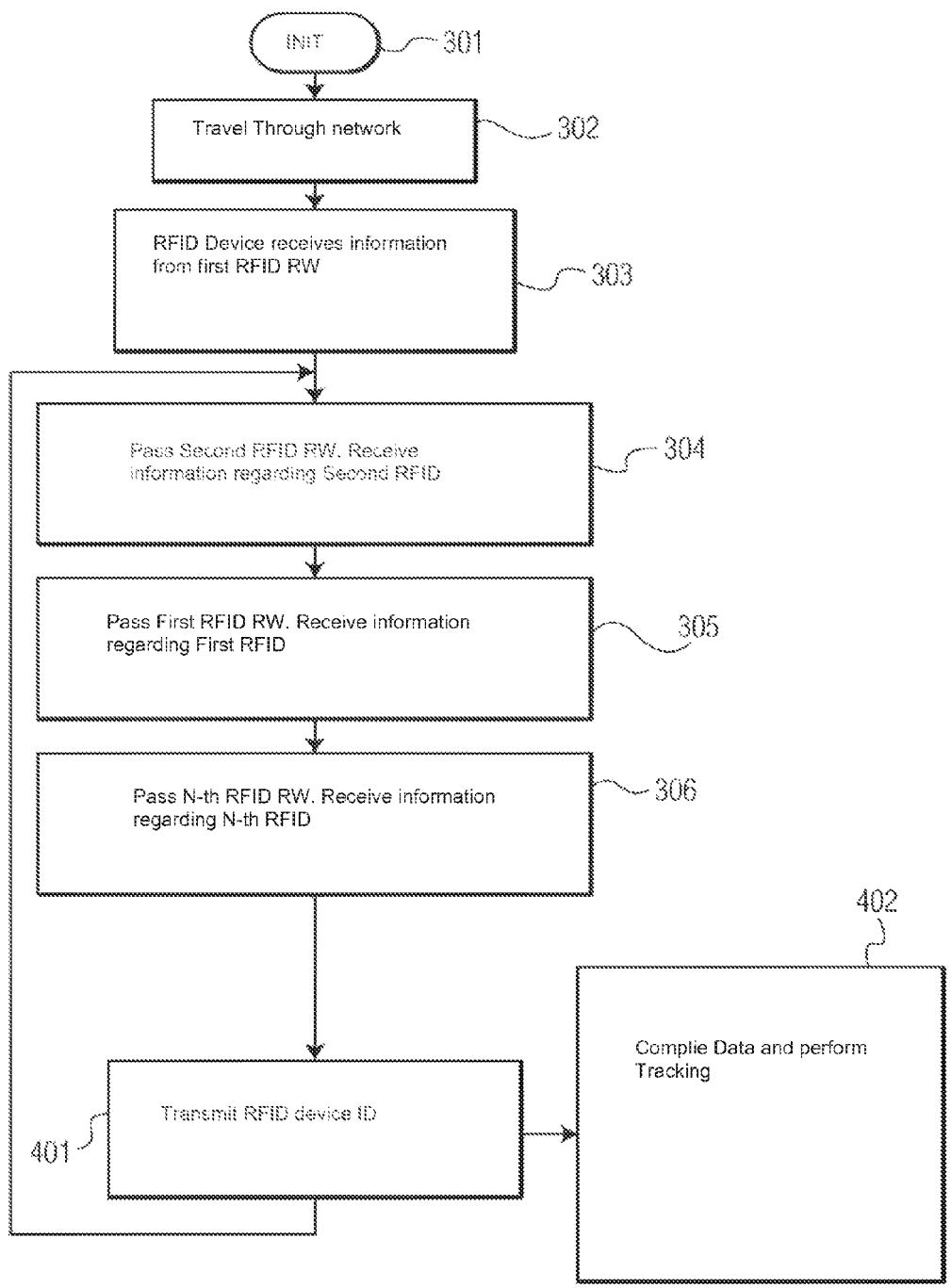
FIG. 4 is a flow chart of a method of determining the location of objects network in accordance with an example embodiment.

FIG. 4 is a flowchart of a method in accordance with an example embodiment. The method of the present example embodiment shares common steps 301-306, which are not repeated in so as to avoid obscuring the description of the present example embodiment.

At step 401, the object 106 transmits the RFID device IDs for each of the RW devices 103-105, and/or the location and, optionally, temporal data garnered in steps 302-306 to the controller 102. In a specific embodiment, the transmission of the information (e.g., information 109) relating to the movement of the object 106 is autonomous, with the object 106 transmitting the data at predetermined times. Alternatively, or additionally, the object 106 may transmit the data after receiving a certain amount of data (e.g., information 109). For example, the transmission may occur after the mobile device has received data from a specified number of RW devices within the system 101. Still alternatively, the object 106 may transmit the data according to predetermined criteria. For example, the object 106 may transmit the data after passing near a specific RW device such as the exit of a building. Notably, the predetermined criteria include the occurrence of a specific event(s). For example, the object 106 may transmit the data in response to external events, such as, a deterioration of the quality of service (QoS), or a patient's exhibiting abnormal measured parameters. As such, the example embodiment provides the transmission of alarming data.

After the data are transmitted to the controller 102, at step 402 the data are compiled by the controller 102 or by the tracking application device, or both, in a manner quite similar to that described in connection with step 309 of the example embodiment of FIG. 3.

The system, devices and methods of the example embodiments provide tracking of the object(s) 106 with the system 102. In specific embodiments, the historical data garnered by the object 106 via the RFID device 107 is provided to the tracking application device 110. These data provide the geographical locations or virtual status of the devices over a period of time, thus providing a tracking capability. In specific embodiments, the object 106 is in direct communication with the controller 102 via the transceiver 108. For example, in an embodiment, where the object 106 is a phone, the controller 102 is an AP and the transceiver 108 is a WLAN device adapted to operate within the network of AP, the object 106 is in communication with the AP substantially continuously. Thus, if the AP wishes the most recent data of the travels of the object (e.g., RFID RW IDs of devices 103-105 {ID_1, ID_2, ID_3} and other associated data such as locations {L_1, L_2, L_n}; and, optionally, timing data), the AP or the tracking application device 110 may query the object 106 for these data.

In addition, because the object(s) 106 include transceivers 108 adapted to operate within the network of the system 101, the tracking of the object(s) 106 across the network may be carried out in an efficient manner. For example, the controller 102 could readily ascertain via known techniques if an object has traveled outside the range of its network. Moreover, the geographical data presented to the controller 102 provides other benefits. Notably, if after compiling the data on an object 106, the controller 102 determines that the object 106 is closer to another controller/system, the controller 102 may initiate a hand-off to the neighboring network using known methods. This is particularly beneficial in managing network capacity in many wireless networks.

In accordance with illustrative embodiments described, a wireless network includes objects located using RFID devices. One of ordinary skill in the art appreciates that many variations that are in accordance with the present teachings are possible and remain within the scope of the appended claims. For example, other types of wireless links may be used. These and other variations would become clear to one of ordinary skill in the art after inspection of the specification, drawings and claims herein. The invention therefore is not to be restricted except within the spirit and scope of the appended claims.

The invention claimed is:

1. A wireless system, comprising:
a stand-alone radio frequency identification read-write (RFID RW) device; and
a plurality of objects, each object including:
a radio frequency identification (RFID) device adapted to receive information from the RFID RW device;
a memory to store said information collected from the RFID RW device when the object is within a known transmission range to said RFID RW device; and
a transceiver adapted to communicate with a controller independent of said RFID RW device, said transceiver communicating said collected information to said controller based at least on a detection of an event matching at least one criteria;
the controller;
receiving the collected information from corresponding ones of the objects, and
determining a path of each of said corresponding ones of the objects based on the information collected from said RFID RW device, wherein said RFID-RW device is adapted not to transmit to said controller.

2. The wireless system as recited in claim 1, wherein the controller is an access point (AP) of the wireless network.

3. The wireless system as recited in claim 1, wherein the information from the RFID RW device is a location of the RFID RW device.

4. The wireless system as recited in claim 1, wherein the information from the RFID RW device includes an identity of the RFD RW device.

5. The wireless system as recited in claim 1, wherein the information from the RFID RW device includes at least one of: a time that the RFD device traveled within the transmission range of the RFID RW device and a time that the RFID device received the transmission from the RFD RW device.

6. The wireless system as recited in claim 1, wherein none of the plurality of objects is connected to a global positioning system (GPS) device.

7. The wireless system as recited in cairn 1, wherein the memory, the transceiver, the RFID device are integrated within each of the plurality of objects.

8. The wireless system as recited in claim 1, further comprising:
the controller queries each of the plurality of objects for providing the collected information.

9. The wireless system as recited in claim 1, wherein each of the plurality of objects autonomously transmits the collected information to the controller.

10. The wireless system as recited in claim 1, further comprising a tracking application device, which compiles tracking information of each of the plurality of objects.

11. The wireless system as recited in claim 10, wherein the tracking application device queries each of the plurality of objects for the collected information.

12. The wireless system as recited in claim 10, wherein each of the plurality of objects autonomously transmits the collected information to the tracking application device.

13. The wireless system as recited in claim 10, wherein the tracking application device queries each of the plurality of objects for the collected information via the controller.

14. The wireless system as recited in claim 13, wherein each of the plurality of objects transmits the collected information to the tracking application device in response to the query.

15. The wireless system as recited in claim 1, wherein each of the plurality of objects is adapted to authenticate a request for the collected information.

16. The wireless system as recited in claim 1, wherein the plurality of objects are selected from a group comprising: cards, cellular telephones, personal digital assistants (PDAs), mobile radio terminals, cellular phones with data terminals, portable computers, or two-way messaging devices, patient monitoring devices, mobile radio terminals, and merchandise tags.

17. An object, comprising:
   a radio frequency identification (RFID) device, adapted to receive information from a stand-alone radio frequency identification read-write (RFID RW) device when within a known transmission range of said RFID RW device; and
   a memory to collect and store said information from the RFID RW device when the object is within the known transmission range to said RFID RW device; and
   a transceiver coupled to the memory, wherein the transceiver is adapted to transmit, independent of said RFID RW device, the collected information stored in said memory to at least one of: a controller and a tracking application device, wherein said transmission of said collected information is based at least on a detection of an event matching at least one criteria and wherein said RFID-RW device is not in communication with said controller or said tracking application device.

18. The object as recited in claim 17, wherein the information from the RFID RW device includes a location of the RFID RW device.

19. The object as recited in claim 17, wherein the information from the RFID RW device includes an identity of the RFID RW device.

20. The object as recited in claim 17, wherein the information from the RFID RW device includes a time that the RFD device traveled within the transmission range of, or received the transmission from, the RFID RW device.

21. The object as recited in claim 17, wherein the object does not include a GPS device.

22. The object as recited in claim 17, wherein the object is one of: a card, a cellular telephone, a personal digital assistant (PDA), a mobile radio terminal, a cellular phone with a data terminal, a portable computer, a two-way messaging device, a patient monitoring device, and a merchandise tag.

23. The object as recited in claim 17, wherein the RFID device and the transceiver are integral with the object.

24. A method of tracking objects, the method comprising:
   providing a plurality of stand-alone radio frequency identification read-write (RFID RW) devices in a wireless network;
   providing a radio frequency identification (RFID) device in an object;
   receiving data from the RFID RW devices in the object when the object is within a transmission range of a corresponding one of the plurality of RFID RW devices;
   storing and collecting the data received from the RFID RW devices in the object;
   providing a transceiver in the object; and
   transmitting, independent of said RFID RW device, the collected data from the object to at least one of: a controller and a tracking application device, said transmission of said collected data being based at least on a detection of an event matching at least one criteria.

25. The method as recited in claim 24, wherein the method further comprises, before the transmitting the collected data from the object, querying the object for the data.

26. The method as recited in claim 24, wherein the object is not queried for the collected data.

27. The method as recited in claim 25, wherein the querying is performed by the controller.

28. The method as recited in claim 25, wherein the querying is performed by the tracking application device.

29. The method as recited in claim 24, wherein the transceiver is a WLAN device.

30. The method as recited in claim 24, wherein the object is one of: a card, a cellular telephone, a personal digital assistant (PDA), a mobile radio terminal, a cellular phone with a data terminal, a portable computer, a two-way messaging device, a patient monitoring device, and a merchandise tag.

* * * * *